(12) United States Patent
Quan et al.

(10) Patent No.: US 9,351,191 B2
(45) Date of Patent: May 24, 2016

(54) METHOD AND APPARATUS FOR DETERMINING LOCATION INFORMATION OF UE DURING MDT PROCEDURE

(71) Applicant: CHINA ACADEMY OF TELECOMMUNICATIONS TECHNOLOGY, Beijing (CN)

(72) Inventors: Haiyang Quan, Beijing (CN); Jing Liang, Beijing (CN); Nan Yan, Beijing (CN); Jing Fu, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 0 days.

(21) Appl. No.: 14/371,433

(22) PCT Filed: Jan. 9, 2013

(86) PCT No.: PCT/CN2013/070280
§ 371 (c)(1),
(2) Date: Jul. 9, 2014

(87) PCT Pub. No.: WO2013/104311
PCT Pub. Date: Jul. 18, 2013

(65) Prior Publication Data
US 2015/0011239 A1 Jan. 8, 2015

(30) Foreign Application Priority Data
Jan. 9, 2012 (CN) .......................... 2012 1 0004827

(51) Int. Cl.
*H04W 24/00* (2009.01)
*H04W 24/10* (2009.01)
(Continued)

(52) U.S. Cl.
CPC ................ *H04W 24/10* (2013.01); *G01S 5/02* (2013.01); *H04W 64/00* (2013.01)

(58) Field of Classification Search
CPC .... H04W 64/00; H04W 4/02; H04M 1/72519
USPC ................................. 455/456.1, 456.6, 550.1
See application file for complete search history.

(56) References Cited

U.S. PATENT DOCUMENTS

2009/0177068 A1* 7/2009 Stivoric et al. ................ 600/365
2011/0149266 A1* 6/2011 Motzer et al. ................ 356/4.01
(Continued)

FOREIGN PATENT DOCUMENTS

CN 102006621 A 4/2011
CN 102056216 A 5/2011
(Continued)

OTHER PUBLICATIONS

European Patent Office Communication enclosing Extended European Search Report for counterpart European Patent Application No. 13736460.0, 10 pages, (Dec. 4, 2014).
(Continued)

*Primary Examiner* — Danh Le
(74) *Attorney, Agent, or Firm* — Blakely, Sokoloff, Taylor & Zafman LLP

(57) ABSTRACT

Disclosed are a method and device for determining user equipment (UE) positioning information during a minimum drive test (MDT) process to ensure that during the MDT realization process, the acquisition of the UE position information is not limited by the positioning capabilities of a network positioning server or the UE, that is, a network side can determine the UE position information required by the MDT without the positioning support function of the positioning server and the UE. The method of the present invention for determining the user equipment (UE) positioning information during a minimum drive test (MDT) process comprises: selecting a UE in a connected state, and determining an MDT measurement result corresponding to the UE (S101); determining the UE positioning information, and adding the UE positioning information to the MDT measurement result corresponding to the UE (S102).

12 Claims, 8 Drawing Sheets

(51) Int. Cl.
*G01S 5/02* (2010.01)
*H04W 64/00* (2009.01)

(56) References Cited

U.S. PATENT DOCUMENTS

| | | | |
|---|---|---|---|
| 2011/0276396 A1* | 11/2011 | Rathod | 705/14.49 |
| 2012/0200407 A1* | 8/2012 | Morris | 340/439 |
| 2012/0208549 A1* | 8/2012 | Lau et al. | 455/456.1 |
| 2014/0051428 A1* | 2/2014 | Jung et al. | 455/422.1 |

FOREIGN PATENT DOCUMENTS

| | | |
|---|---|---|
| EP | 2 360 961 A2 | 8/2011 |
| WO | WO 2005/115040 A1 | 12/2005 |
| WO | WO 2011/083802 A1 | 7/2011 |

OTHER PUBLICATIONS

Catt, "Location Info Enhancement for Rel-11 MDT", 3GPP TSG RAN WG2 Meeting #76, R2-116022, San Francisco, USA, 3 pages, (Nov. 14-18, 2011).

Ericsson, "Implications on Solution for MDT Positioning", 3GPP TSG-SA5 (Telecom Management) Meeting SA5#79, S5-112966, Nanjing, P.R. China, 2 pages, (Oct. 10-14, 2011).

Huawei, "MDT Location Control and Correlation", 3GPP TSG-RAN WG2 #70bis, R2-104674, Madrid, Spain, 8 pages, (Aug. 23-27, 2010).

NTT Docomo, Inc., et al., "Requirements, Priority and Solution for MDT Location Information Enhancement", 3GPP TSG-RAN2#76, R2-116135, San Francisco, USA, 6 pages, (Nov. 14-18, 2011).

PCT International Search Report for PCT Counterpart Application No. PCT/CN2013/070280, 6 pgs., (Apr. 25, 2013).

\* cited by examiner

METHOD AND APPARATUS FOR DETERMINING LOCATION INFORMATION OF UE DURING MDT PROCEDURE

CROSS-REFERENCE TO RELATED APPLICATIONS

The present application is a U.S. National Stage under 35 U.S.C. §371 of International Application No. PCT/CN2013/070280, filed on Jan. 9, 2013, entitled METHOD AND DEVICE FOR DETERMINING UE POSITIONING INFORMATION DURING MDT PROCESS, designating the United States, and claiming priority to Chinese Patent Application No. 201210004827.0, filed with the Chinese Patent Office on Jan. 9, 2012 and entitled "Method and Apparatus for Determining Location Information of UE during MDT Procedure", which was incorporated by reference in its entirety.

Field of the Invention

The present invention relates to the field of communications and particularly to a method and apparatus for determining location information of a UE during an MDT procedure.

BACKGROUND OF THE INVENTION

Among the characteristics of a Minimum Drive Test (MDT), an important aspect is how to obtain relatively precise location information. An existing scheme is as follows: a User Equipment (UE) tries its best to provide location information according to its own condition without additionally obtaining location information for the MDT.

If a UE is provided with the function of a Global Navigation Satellite System (GNSS), e.g., a Global Positioning System (GPS), then the current location of the UE can be obtained directly by using the GPS, which is referred to as standalone GNSS positioning.

Due to the costly GPS and considerable fading of a GPS signal in an indoor scenario, a scheme has been proposed to obtain location information of a UE over a mobile communication network, i.e., a LoCation Service (LCS), typically the Cell Identifier (ID) and enhanced Cell ID schemes, the Observed Time Difference of Arrival (OTDOA) scheme, the Assisted-Global Navigation Satellite System (A-GNSS) scheme, etc.

An LTE LCS control-plane positioning flow as illustrated in FIG. 1 includes the following steps:

1. A Mobility Management Entity (MME) receives a location service request, which may be a request initiated by a UE to the MME via a Non-Access Stratum message or may be a location service request initiated by some entity in an Evolved Packet Core (EPC) (e.g., a Gateway Mobile Location Center (GMLC)) or initiated inside the MME;

2. The MME sends the location service request to an Enhanced Serving Mobile Location Center (E-SMLC), and the E-SMLC selects an appropriate positioning scheme according to Quality of Service (QoS) information carried in the location service request, e.g., the precision and delay in positioning, etc.;

3a. The E-SMLC may trigger an eNB-related positioning procedure according to the LTE Positioning Protocol A (LPPa), for example, to obtain auxiliary data required for positioning or a measurement required for positioning;

3b. The E-SMLC may trigger a UE-related positioning procedure according to the LTE Positioning Protocol (LPP), for example, to obtain a location estimation, to transmit auxiliary data required for positioning or to obtain a measurement required for positioning;

4. The E-SMLC sends a location service response to the MME, which includes some required results, e.g., the location of the UE, an indicator of a successful positioning or a failed positioning, etc.;

5. The MME sends the location service response to the target entity.

Apparently, if the location information of the UE is obtained through the LCS positioning scheme, then the UE has to be in a connected state and interact with multiple network nodes.

A context of the $T_{ADV}$+AoA positioning scheme (an enhanced cell ID-based positioning scheme) will be introduced below.

The positioning principle is as follows:

In the cell ID-based positioning scheme which is a cell coverage-based positioning scheme, the location of a target UE is estimated from known geographical information of a serving cell. The geographical information of the serving cell can be obtained through calling, paging, Tracking Area (TA) updating, etc. In the $T_{ADV}$+AoA positioning scheme based on the cell ID-positioning scheme, the factors of a Timing Advance ($T_{ADV}$) and an Angle of Arrival (AoA) are taken into account for the purpose of more precise positioning.

An evolved Node B (eNB) obtains the AoA of the UE transmitting a signal via an intelligent antenna, where the UE lies on a radial line starting from the eNB and rotated counterclockwise from the direction of the exact north by the AoA;

The $T_{ADV}$ can be derived from the time difference between UE reception and transmission, reported by the user equipment, plus the time difference between reception and transmission, measured by the eNB (the $T_{ADV}$ calculated as such is referred to as a $T_{ADV}$ TYPE1), or can be measured by the eNB during a dedicated random access procedure (the $T_{ADV}$ calculated as such is referred to as a $T_{ADV}$ TYPE2). A result that the $T_{ADV}$ is multiplied with the velocity of light and then is divided by two represents the distance between the UE and the eNB, where the UE lies on a circle with the center thereof being the eNB and the radius being the distance between the user equipment and the eNB, and location information of the user equipment can be obtained according to the angle information of the AoA, as illustrated in FIG. 2.

The $T_{ADV}$+AoA positioning scheme is typically applicable to network-based positioning, primarily because the AoA can be measured only by the eNB, and the $T_{ADV}$ TYPE1 and the $T_{ADV}$ TYPE2 are also calculated or measured by the eNB, that is, all of the measured quantities related to the positioning scheme are provided by the eNB. All of these measured quantities can be provided by the eNB to a location server, so the purpose of positioning can be achieved by supporting network-based positioning. There is such a resulted advantage of the scheme that a user equipment for which no location service is supported can also be positioned through this scheme.

A positioning flow is as flows:

Positioning by using this scheme an existing LTE system generally relates to the following flow:

A measurement capability of a user equipment is obtained, a location server decides a required measured quantity, an eNB starts a relevant measurement, the eNB reports a relevant measurement result and location information, and the location server calculates about the location. General flows of the $T_{ADV}$+AoA positioning scheme in two scenarios will be given below:

In a first scenario, positioning is performed by using measurement results of $T_{ADV}$ TYPE1+AoA, as illustrated in FIG. 3, this process includes the following steps:

Step 11: A UE initiates a location request to an MME via an NAS message to request for its own location information, or some LoCation Service (LCS) client may initiate a location request to the MME to request for location information of some UE;

Step 12: The MME initiates the location request to an E-SMLC;

Step 13a/13b: The E-SMLC inquires about and obtains positioning capability information of the UE;

Step 14a/14b/14c: The E-SMLC obtains a relevant measurement result of an eNB and information of a serving cell;

Step 15a/15b/15c: The eNB triggers measurements of a $T_{ADV}$ TYPE1, a timing deviation for receiving a signal from the UE by the eNB, and the AoA as requested by the E-SMLC;

Step 16: The E-SMLC calculates location information of the UE according to measurement results of the eNB and inputs from other parts;

Step 17: The E-SMLC sends a location result (the location information) to the MME;

Step 18: The MME sends the location result (the location information) to the UE or the LoCation Service (LCS) client.

In a second scenario, positioning is performed by using measurement results of $T_{ADV}$ TYPE2+AoA, as illustrated in FIG. 4, this process includes the following steps:

Step 21: Some LoCation Service (LCS) client initiates a location request to an MME to request for location information of some UE, which may be a user equipment supporting a location service or may be a user equipment supporting no location service;

Step 22: The MME initiates the location request to an E-SMLC;

Step 23a/23b: The E-SMLC inquires about and obtains positioning capability information of the UE, where this step may be skipped if the UE supports no location service;

Step 24a/24b/24c: The E-SMLC obtains a relevant measurement result of an eNB and information of a serving cell;

Step 25a/25b: The eNB triggers a dedicated random access procedure to obtain a $T_{ADV}$ TYPE2 and triggers a measurement of an AoA at the physical layer as requested by the E-SMLC;

Step 26: The E-SMLC calculates location information of the UE according to measurement results of the eNB and inputs from other parts;

Step 27: The E-SMLC sends a location result (the location information) to the MME;

Step 28: The MME sends the location result (the location information) to the LCS client, where the LCS client may be the positioned UE itself.

MDT measurements are categorized as follows:

An immediate MDT refers to an MDT measurement and report made in a connected state. A Radio Resource Management (RRM) measurement mechanism is reused, and once a report condition is satisfied, a report is made to an eNB or a Radio Network Controller (RNC) immediately.

A Logged MDT refers to an MDT measurement in an idle state and a report in a subsequent connected state. Once a configured trigger condition is satisfied, a measurement result is obtained and logged and is reported to an eNB or an RNC on a subsequent appropriate occasion.

A configuration and a report of the immediate MDT will be introduced as follows:

The immediate MDT is adopted in a connected state.

The immediate MDT is still based on the existing measurement mechanism, and geographical location information is added thereto. The geographical location information is optional, and a UE is not required by a network to obtain precise geographical location information for the purpose of MDT.

An immediate report is made for the immediate MDT without recording any time information by a UE. All of the time information is determined by an eNB or an RNC from the time when an MDT measurement result is reported by the UE.

In the LTE system, the following bolded section relates to an MDT-related measurement result.

```
MeasResults ::=                    SEQUeNBCE {
    measId                             MeasId,
    measResultPCell                    SEQUeNBCE {
        rsrpResult                         RSRP-Range,
        rsrqResult                         RSRQ-Range
    },
    measResultNeighCells               CHOICE {
        measResultListEUTRA                MeasResultListEUTRA,
        measResultListUTRA                 MeasResultListUTRA,
        measResultListGERAN                MeasResultListGERAN,
        measResultsCDMA2000                MeasResultsCDMA2000,
        ...
    }                                                                OPTIONAL,
    ...,
    [[ measResultForECID-r9            MeasResultForECID-r9   OPTIONAL
    ]],
    [[ locationInfo-r10                LocationInfo-r10       OPTIONAL,
       measResultServFreqList-r10         MeasResultServFreqList-r10  OPTIONAL
    ]]
}
```

A flow of reporting an MDT measurement result, as illustrated in FIG. 5, includes:

A user equipment makes a measurement according to a measurement configuration of a network and reports a result to an eNB or an RNC, and the eNB or the RNC further forwards the MDT measurement results to a Trace Control Entity (TCE) through an Element Management (EM) entity after collecting the MDT measurement results for a period of time. In this flow, the eNB or the RNC is responsible for forwarding a trace record to the TCE.

In summary, all of the existing positioning schemes involve the location server, and most of them have to be assisted by the user equipment. During the MDT procedure, the existing scheme is as follows: the user equipment tries its best to provide location information according to its own condition without additionally obtaining location information for the purpose of MDT, consequently the existing scheme may be limited by the positioning capability of the user equipment.

SUMMARY OF THE INVENTION

Embodiments of the invention provide a method and apparatus for determining location information of a UE during an MDT procedure, so as to ensure the location information of the UE to be obtained during the MDT procedure without being limited to a location server of a network and by a positioning capability of the user equipment, that is, the location information of the UE required for the MDT can be determined at the network side without the location server and any positioning support function of the user equipment.

An embodiment of the invention provides a method for determining location information of a UE during an MDT procedure, including:

selecting a UE in a connected state and determining an MDT measurement result corresponding to the UE; and determining and adding the location information of the UE to the MDT measurement result corresponding to the UE.

An embodiment of the invention provides an apparatus for determining location information of a UE during an MDT procedure, including:

an MDT measurement result determining component configured to select a UE in a connected status and determine an MDT measurement result corresponding to the UE; and a location information adding component configured to determine and add the location information of the UE to the MDT measurement result corresponding to the UE.

In the embodiments of the invention, the UE in the connected state is selected, and the MDT measurement result corresponding to the UE is determined; and the location information of the UE is determined and added to the MDT measurement result corresponding to the UE, thus ensuring the location information of the UE to be obtained while performing an MDT function without being limited by a location server of a network and a positioning capability of the user equipment, simplifying a flow of obtaining the location information of the UE, decreasing a delay in positioning, making the MDT measurement result more timely and making it possible to provide relevant location information for all the online user equipments without being limited by the positioning capability of the user equipment.

DETAILED DESCRIPTION OF THE EMBODIMENTS

Embodiments of the invention provide a method and apparatus for determining location information of a UE during an MDT procedure, so as to ensure the location information of the UE to be obtained during the MDT procedure without being limited to a location server of a network and by a positioning capability of the UE, that is, the location information of the UE required for the MDT can be determined at the network side without the location server and any positioning support function of the user equipment.

Among the characteristics of the MDT, an important aspect is how to obtain relatively precise location information. An existing scheme is as follows: the user equipment tries its best to provide location information according to its own condition without additionally obtaining location information for the purpose of MDT. However, along with the development of technologies, there is a more specific demand of an operator, and location information of a UE has become necessary information during an MDT procedure. The embodiments of the invention provide such a technical solution that MDT-related location information is provided by using the $T_{ADV}$+AoA positioning scheme for a user equipment in a connected state.

In the embodiments of the invention, a network side equipment (an eNB or an RNC) selects an online user equipment in a cell according to a demand of MDT and instructs the user equipment to make an MDT measurement or makes the MDT measurement on the user equipment, performs $T_{ADV}$+AoA positioning according to an uplink signal of the user equipment and adds a location result or a location-related measurement result to an MDT measurement result reported by the user equipment.

Figure 1:
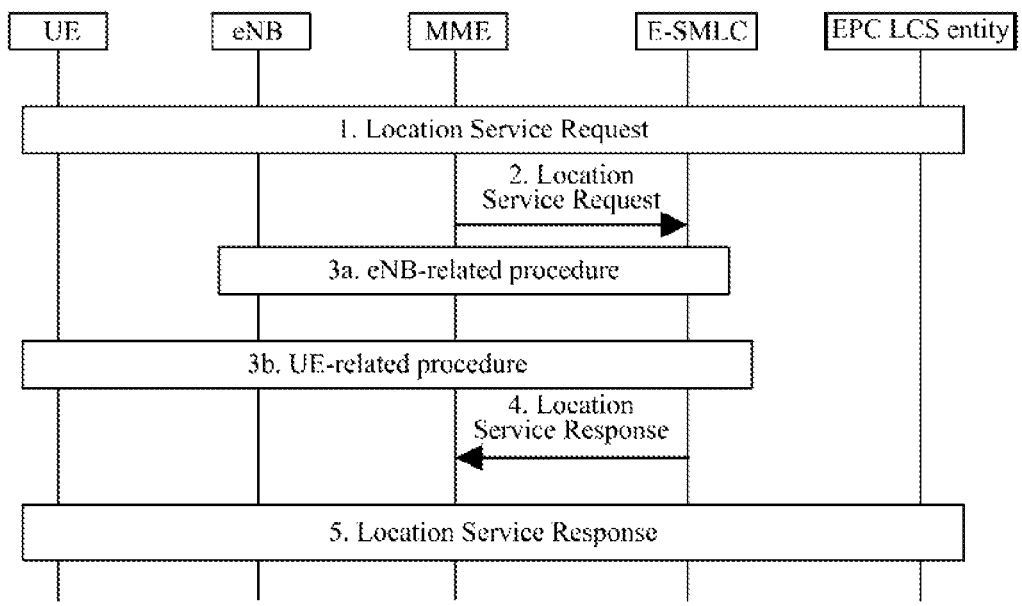
FIG. 1 is a schematic diagram of an LTE control-plane positioning flow.
Figure 2:
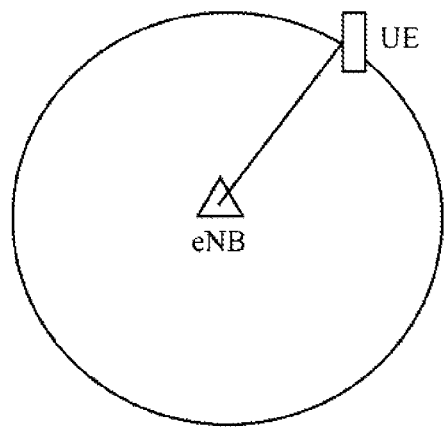
FIG. 2 is a schematic diagram of a positioning principle of $T_{ADV}$+AoA.
Figure 3:
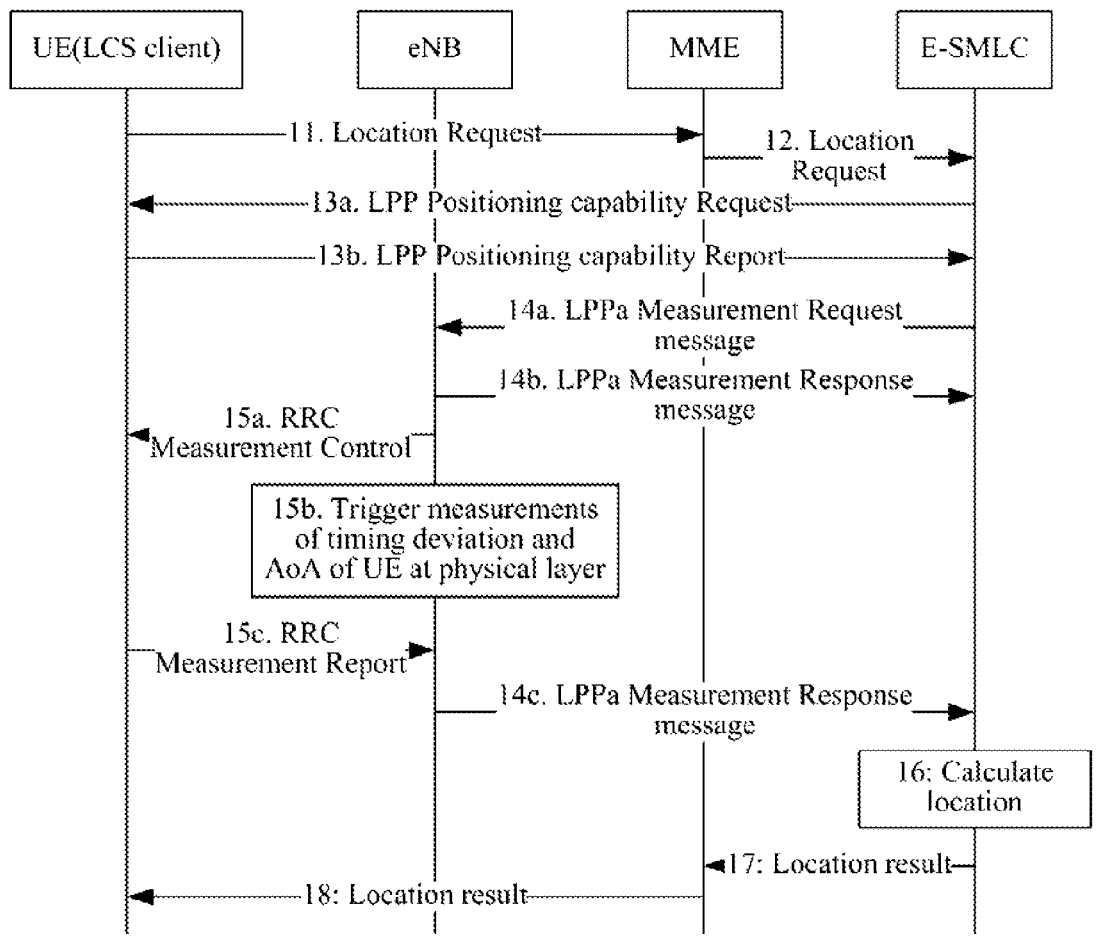
FIG. 3 is a schematic diagram of a $T_{ADV}$+AoA positioning flow ($T_{ADV}$ TYPE1)
Figure 4:
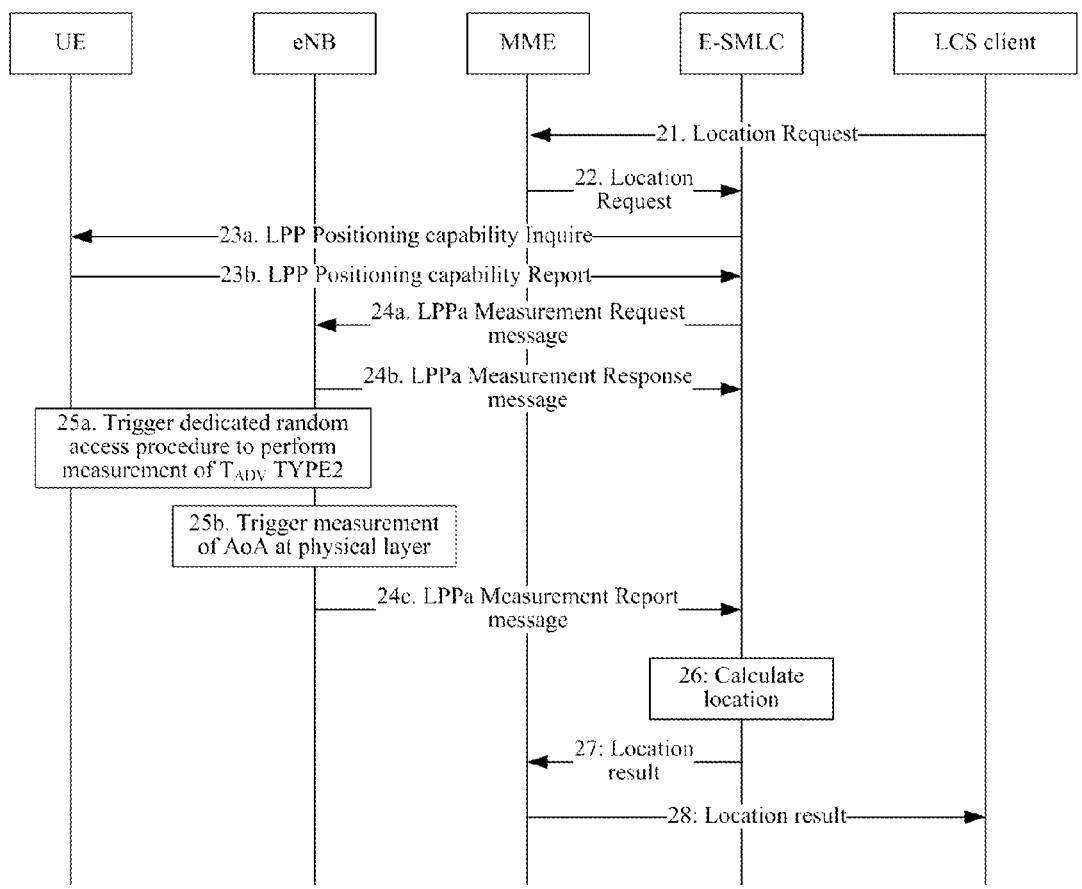
FIG. 4 is a schematic diagram of a $T_{ADV}$+AoA positioning flow ($T_{ADV}$ TYPE2)
Figure 5:
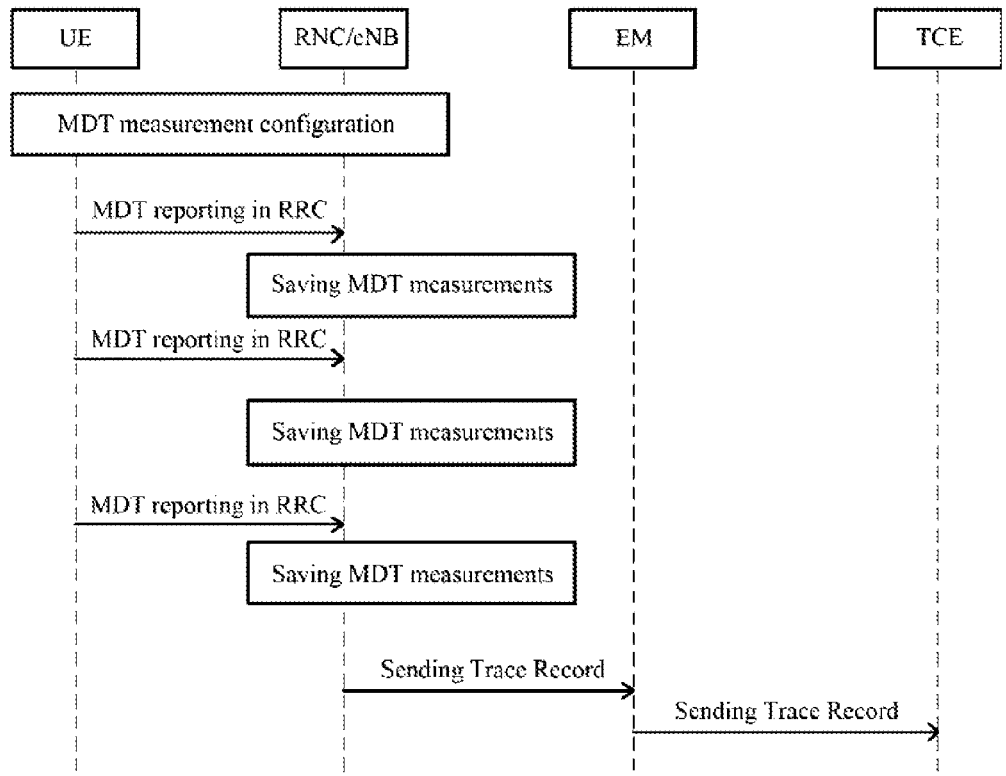
FIG. 5 is a schematic diagram of a flow of reporting an MDT result in a connected state.
Figure 6:
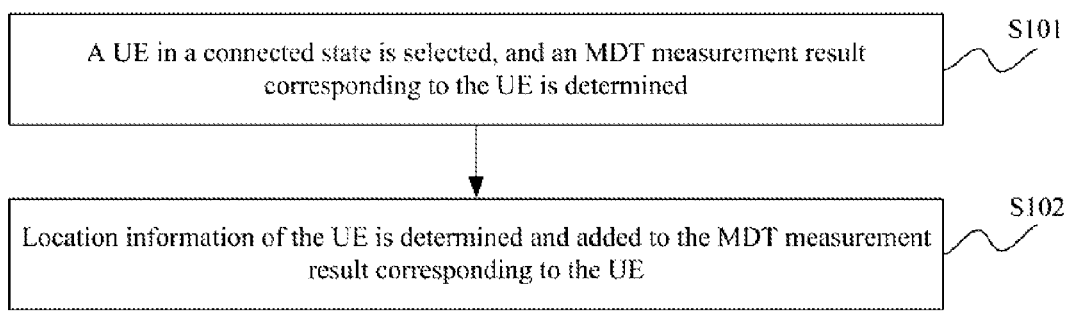
FIG. 6 is a schematic flow chart of a general method for determining location information of a UE in a Minimum Drive Test according to an embodiment of the invention.

Referring to FIG. 6, an embodiment of the invention provides a method for determining location information of a UE during an MDT procedure, the method includes the following steps:

S101. A UE in a connected state is selected, and an MDT measurement result corresponding to the UE is determined; and S102. Location information of the UE is determined and added to the MDT measurement result corresponding to the UE.

Preferably, the MDT measurement result corresponding to the UE is determined as follows:

A network side equipment configures the UE with an MDT measurement, triggers the UE to make the MDT measurement and obtains the MDT measurement result reported by the UE; or The network side equipment makes the MDT measurement on the UE and determines the MDT measurement result corresponding to the UE.

In other words, in the embodiment of the invention, the MDT measurement result may be made and reported by the UE to the network side equipment, or the MDT measurement may be made by the network side equipment (an eNB/an RNC), that is, the network side equipment makes the MDT measurement, where the network side equipment makes $T_{ADV}$+AoA-related measurements, and adds the location information to a trace report message send by the network side equipment to a TCE, and in this case, the UE needs not be configured by the network side to make any MDT measurement, but instead the network side equipment makes the relevant MDT measurement on the UE after selecting the UE for the MDT.

The trace report message sent by the network side equipment to the TCE is a trace record.

Preferably, the location information of the UE is determined as follows:

A Timing Advance ($T_{ADV}$) and an Angle of Arrival (AoA) corresponding to the UE are determined; and The location information of the UE is calculated according to the $T_{ADV}$ and the AoA corresponding to the UE; or the $T_{ADV}$ and the AoA corresponding to the UE and information of a serving cell where the UE is currently located are determined as the location information of the UE.

Preferably, the information of the serving cell where the UE is currently located is a cell ID. Optionally, the information of the serving cell where the UE is currently located may be geographical location information of a cell antenna.

Preferably, the method further includes:

The MDT measurement result to which the location information of the UE is added is sent to the TCE.

Preferably, the MDT measurement result to which the location information of the UE is added is sent to the TCE as follows:

Multiple MDT measurement results and multiple pieces of location information of the UE added to the MDT measurement results are recorded; and The recorded multiple MDT measurement results and multiple pieces of location information of the UE added to the MDT measurement results are sent to the TCE by reporting the trace record.

The trace record is the trace record.

Preferably, the MDT measurement result to which the location information of the UE is added is sent to the TCE through an EM.

Four particular embodiments will be described below.

First Embodiment

Figure 7:
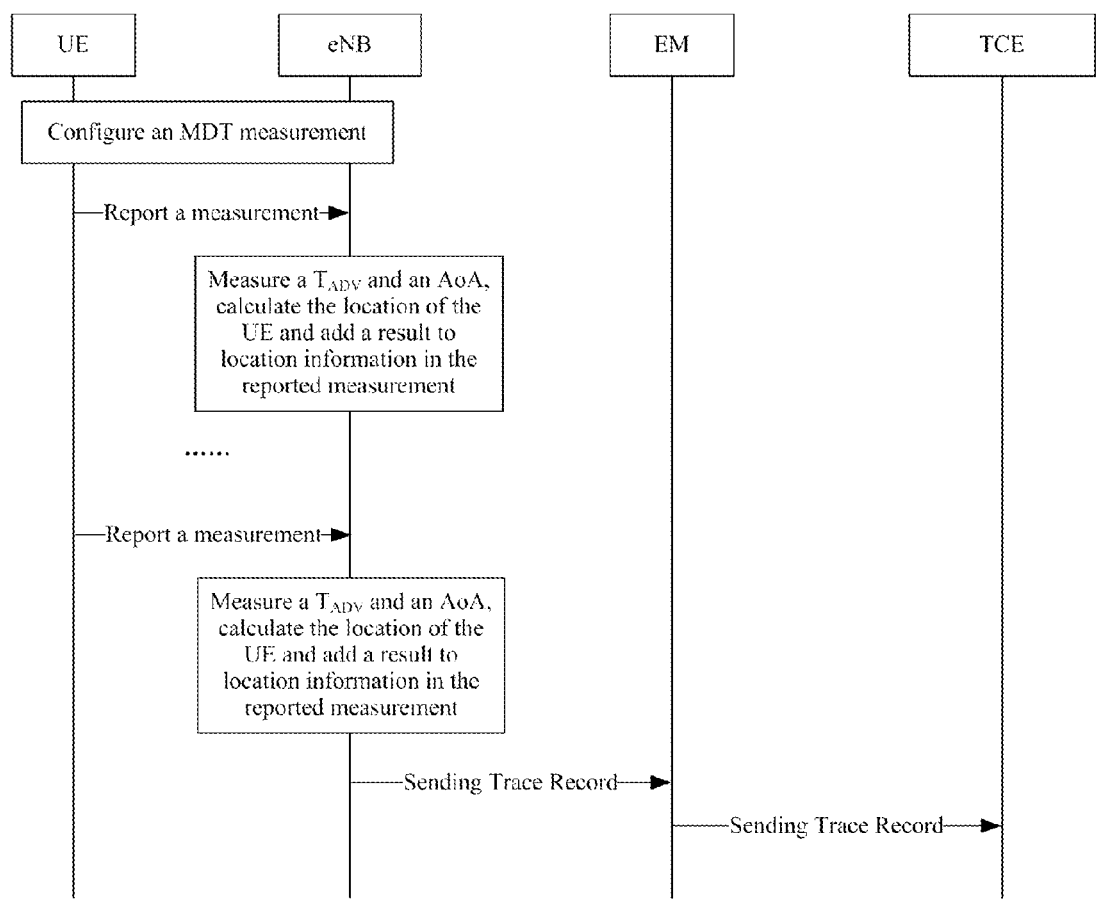
FIG. 7 is a schematic flow chart of reporting an MDT measurement to which location information is added according to an embodiment of the invention.

A flow of adding location information of a UE to an MDT measurement result in an LTE system without involving a location server as illustrated in FIG. 7 includes:

An eNB selects a UE in a connected state to perform an MDT function and configures an MDT measurement.

The UE reports an MDT measurement result.

The eNB measures an uplink signal of the UE and obtains a $T_{ADV}$ and an AoA, and in order to ensure the accuracy of the $T_{ADV}$, the eNB may trigger the UE to send a dedicated preamble.

The eNB can calculate the location of the UE according to the $T_{ADV}$, the AoA and the geographical location information of the cell as in the prior art upon reception of the MDT measurement result, to determine the location information of the UE, and add the location information of the UE to the MDT measurement result.

The processes of reporting the MDT measurement result, measuring the $T_{ADV}$ and the AoA, calculating the location of the UE and adding the location information of the UE to the MDT measurement result are repeated.

The eNB triggers to report a trace record after collecting the location information of the UE and the MDT measurement result for a period of time (the particular length of which can be set as needed in practice) or a preset number of times, where the trace record includes the collected and recorded multiple MDT measurement results, each of which includes the location information of the UE, and the trace record is sent to a TCE through an EM.

Second Embodiment

Figure 8:
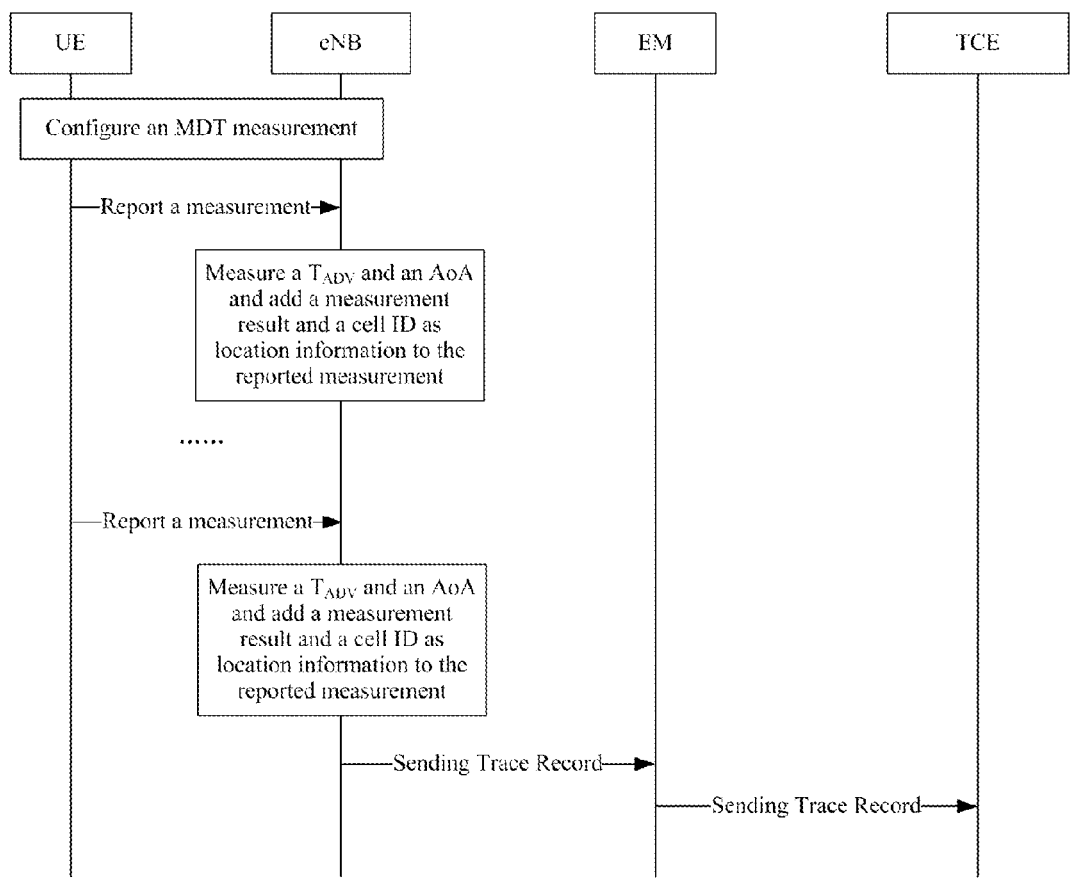
FIG. 8 is a schematic flow chart of reporting an MDT measurement to which location information is added according to an embodiment of the invention.

A flow of adding location information of a UE to an MDT measurement result in an LTE system without involving a location server as illustrated in FIG. 8 includes:

An eNB selects a UE in a connected state to perform an MDT function and configures an MDT measurement.

The UE reports an MDT measurement result.

The eNB measures an uplink signal of the UE and obtains a $T_{ADV}$ and an AoA, and in order to ensure the accuracy of the $T_{ADV}$, the eNB may trigger the UE to send a dedicated preamble.

The eNB adds the $T_{ADV}$, the AoA and the cell ID as location information of the UE to the MDT measurement result upon reception of the MDT measurement result, where the cell ID is the information of a serving cell where the UE is currently located.

The processes of reporting the MDT measurement result, measuring the $T_{ADV}$ and the AoA and adding the location information of the UE to the MDT measurement result are repeated.

The eNB triggers to report a trace record after collecting the location information of the UE and the MDT measurement result for a period of time (the particular length of which can be set as needed in practice) or a preset number of times, where the trace record includes the collected and recorded multiple MDT measurement results, each of which includes the location information of the UE, and the trace record is sent to a TCE through an EM.

Third Embodiment

Figure 9:
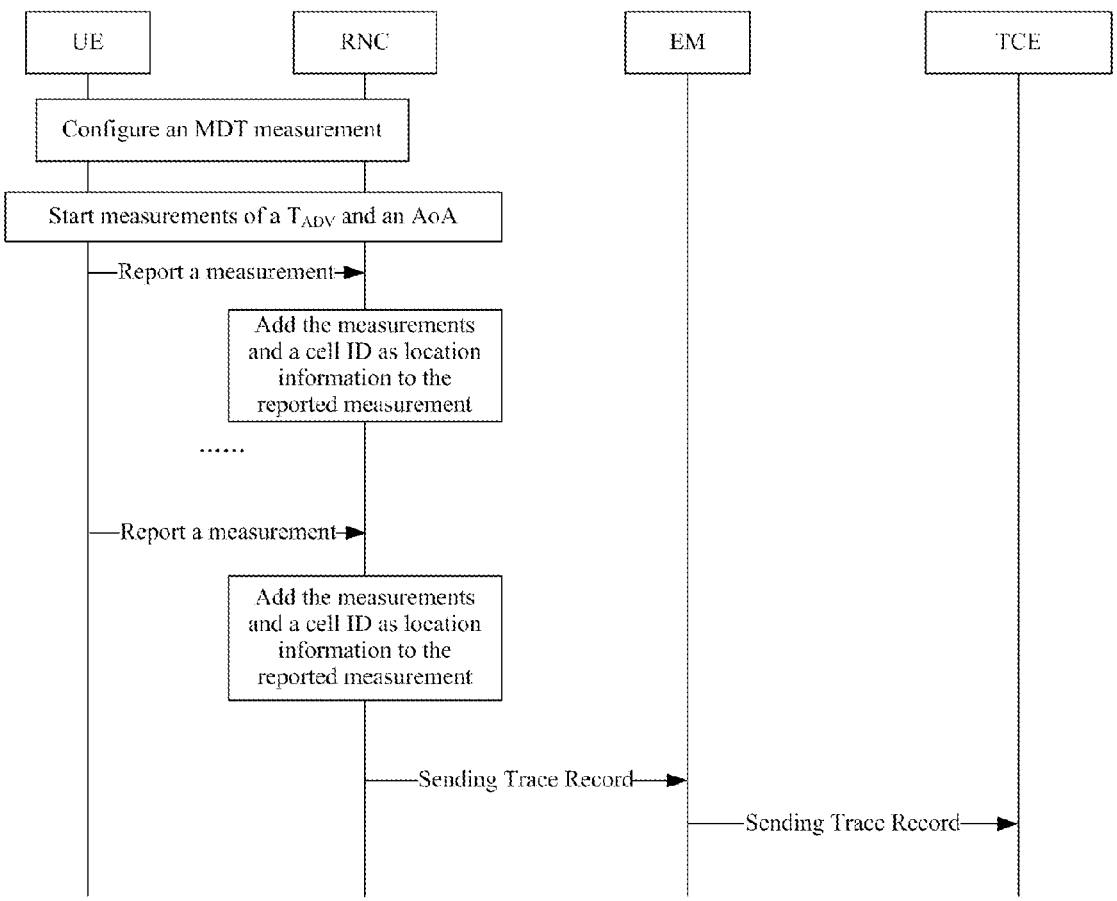
FIG. 9 is a schematic flow chart of reporting (in a UMTS) an MDT measurement to which location information is added according to an embodiment of the invention.

A flow of adding location information of a UE to an MDT measurement result in a UMTS without involving a location server as illustrated in FIG. 9 includes:

An RNC selects a UE in a connected state to perform an MDT function and configures an MDT measurement.

The UE reports an MDT measurement result, and the RNC configures $T_{ADV}$ and AoA related measurements.

The RNC adds the $T_{ADV}$, the AoA and the cell ID as location information of the UE to the MDT measurement result upon reception of the MDT measurement result.

The processes of reporting the MDT measurement result, measuring the $T_{ADV}$ and the AoA and adding the location information of the UE to the MDT measurement result are repeated.

The RNC triggers to report a trace record after collecting the location information of the UE and the MDT measurement result for a period of time (the particular length of which can be set as needed in practice) or a preset number of times, where the trace record includes the collected and recorded multiple MDT measurement results, each of which includes the location information of the UE, and the trace record is sent to a TCE through an EM.

Fourth Embodiment

Figure 10:
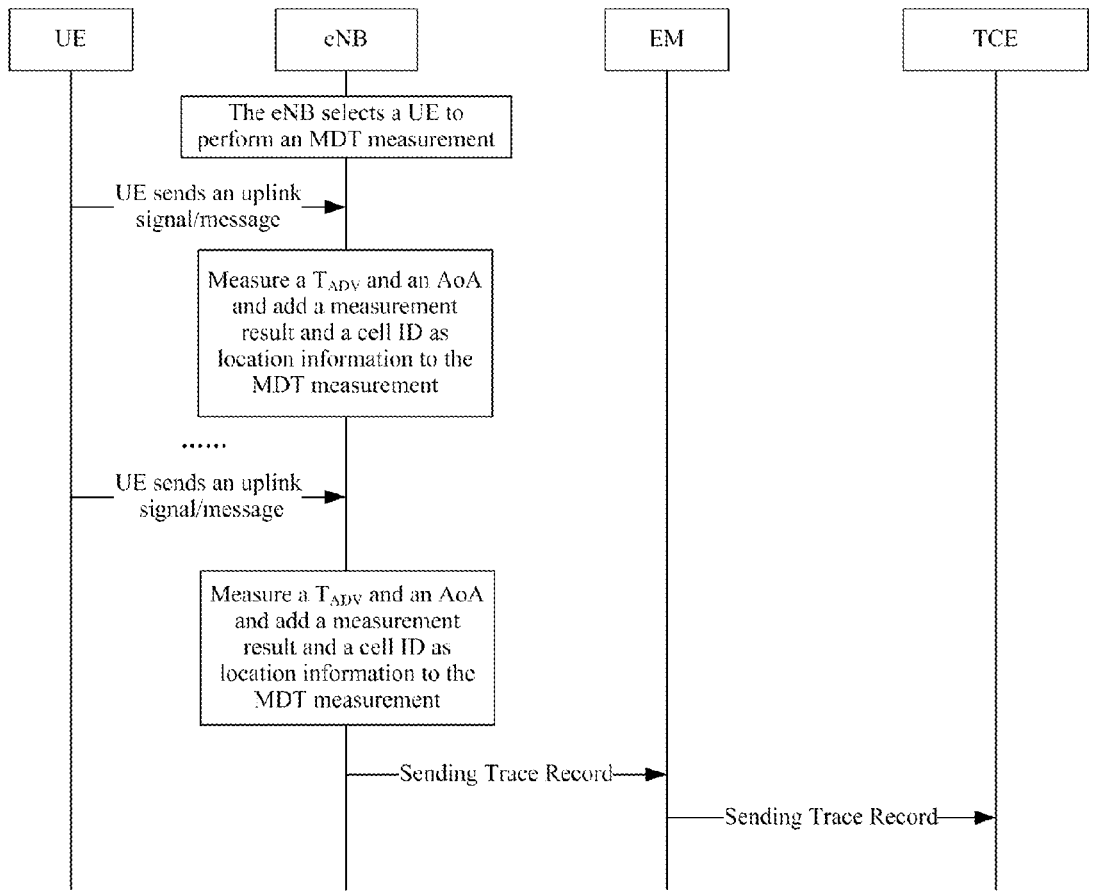
FIG. 10 is a schematic flow chart of reporting an MDT measurement to which location information is added according to an embodiment of the invention.

A flow of adding location information of a UE to an MDT measurement result in an LTE system without involving a location server as illustrated in FIG. 10 includes:

An eNB selects a UE in a connected state to perform an MDT function and makes an MDT measurement on the UE.

The eNB measures an uplink signal of the UE and obtains a $T_{ADV}$ and an AoA, and in order to ensure the accuracy of the $T_{ADV}$, the eNB may trigger the UE to send a dedicated preamble.

The eNB adds the $T_{ADV}$, the AoA and the cell ID as location information of the UE to an MDT measurement result for the UE after obtaining the MDT measurement result.

The processes of making the MDT measurement on the UE, measuring the $T_{ADV}$ and the AoA and adding the location information of the UE to the MDT measurement result are repeated.

The eNB triggers to report a trace record after collecting the location information of the UE and the MDT measurement result for a period of time (the particular length of which can be set as needed in practice) or a preset number of times, where the trace record includes the collected and recorded multiple MDT measurement results, each of which includes the location information of the UE, and the trace record is sent to a TCE through an EM.

Figure 11:
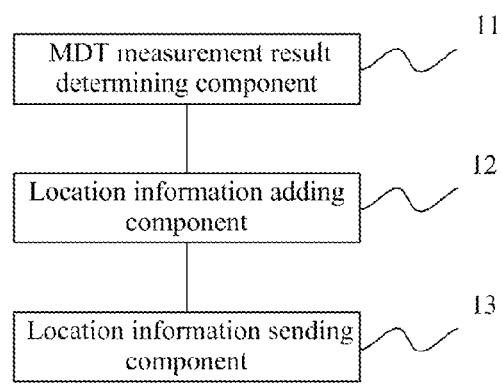
FIG. 11 is a schematic structural diagram of an apparatus for determining location information of a UE in a Minimum Drive Test according to an embodiment of the invention.

Referring to FIG. 11, an embodiment of the invention provides an apparatus for determining location information of a UE during an MDT procedure, the apparatus includes:

an MDT measurement result determining component 11 configured to select a UE in a connected state and determine an MDT measurement result corresponding to the UE; and a location information adding component 12 configured to determine and add location information of the UE to the MDT measurement result corresponding to the UE.

Preferably, the MDT measurement result determining component 11 is configured to configure the UE with an MDT measurement, trigger the UE to perform the MDT measurement and obtain the MDT measurement result reported by the UE; or is configured to make the MDT measurement on the UE and determine the MDT measurement result corresponding to the UE.

Preferably, the location information adding component 12 is configured to determine a Timing Advance ($T_{ADV}$) and an Angle of Arrival (AoA) corresponding to the UE; and calculate the location information of the UE according to the $T_{ADV}$ and the AoA corresponding to the UE, or determine the $T_{ADV}$ and the AoA corresponding to the UE and information of a serving cell where the UE is currently located as the location information of the UE.

Preferably, the apparatus further includes:

a location information sending component 13 configured to send the MDT measurement result, to which the location information of the UE is added, to a Trace Control Entity.

Preferably, the location information sending component 13 is configured to record multiple MDT measurement results and multiple pieces of location information of the UE added to the MDT measurement results; and send the recorded multiple MDT measurement results and multiple pieces of location information of the UE added to the MDT measurement results to the TCE by reporting a trace record.

Preferably, the location information sending component 13 is configured to send the MDT measurement result, to which the location information of the UE is added, to the TCE through an EM.

Preferably, the apparatus for determining location information of a UE during an MDT procedure according to the embodiment of the invention may be an eNB or an RNC.

In summary, in the technical solutions according to the embodiments of the invention, location information of a user equipment is obtained during an MDT procedure, and without involving a location server, an eNB/an RNC itself positions the user equipment and adds a positioning result or the location information to the trace record, and sends the trace record to the TCE, thus simplifying a flow of obtaining the location information, decreasing a delay in positioning, making an MDT measurement result more timely and making it possible to provide relevant location information for all the online user equipments without being limited by the positioning capability of the user equipment.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable data processing device provide steps for performing the functions specified in the flow(s) of the flow chart and/or the block(s) of the block diagram.

Evidently, those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

What is claimed is:

1. A method for determining location information of a User Equipment, UE, during a Minimum Drive Test, MDT, procedure, comprising:

selecting a UE in a connected state and determining an MDT measurement result corresponding to the UE; and determining and adding the location information of the UE to the MDT measurement result corresponding to the UE, wherein determining the location information of the UE comprises:
- determining a Timing Advance, $T_{ADV}$, and an Angle of Arrival, AoA, corresponding to the UE, and
- calculating the location information of the UE according to the $T_{ADV}$ and the AoA corresponding to the UE; or determining the $T_{ADV}$ and the AoA corresponding to the UE and information of a serving cell where the UE is currently located as the location information of the UE.

2. The method according to claim 1, wherein determining the MDT measurement result corresponding to the UE comprises:
- a network side equipment configuring the UE with an MDT measurement, triggering the UE to perform the MDT measurement and obtaining the MDT measurement result reported by the UE; or
- the network side equipment making the MDT measurement on the UE and determining the MDT measurement result corresponding to the UE.

3. The method according to claim 2, further comprising: sending the MDT measurement result, to which the location information of the UE is added, to a Trace Control Entity.

4. The method according to claim 1, further comprising: sending the MDT measurement result, to which the location information of the UE is added, to a Trace Control Entity.

5. The method according to claim 4, wherein sending the MDT measurement result, to which the location information of the UE is added, to the Trace Control Entity comprises:
- recording multiple MDT measurement results and multiple pieces of the location information of the UE added to the MDT measurement results; and
- sending the recorded multiple MDT measurement results and multiple pieces of the location information of the UE added to the MDT measurement results to the Trace Control Entity by reporting a trace record.

6. The method according to claim 4, wherein the MDT measurement result, to which the location information of the UE is added, is sent to the Trace Control Entity through an Element Management, EM.

7. An apparatus for determining location information of a User Equipment, UE, during a Minimum Drive Test, MDT, procedure, comprising:
- an MDT measurement result determining component configured to select a UE in a connected state and determine an MDT measurement result corresponding to the UE; and
- a location information adding component configured to determine and add the location information of the UE to the MDT measurement result corresponding to the UE,
- wherein the location information adding component is configured to determine a Timing Advance, $T_{ADV}$, and an Angle of Arrival, AoA, corresponding to the UE; and calculate the location information of the UE according to the $T_{ADV}$ and the AoA corresponding to the UE, or determine the $T_{ADV}$ and the AoA corresponding to the UE and information of a serving cell where the UE is currently located as the location information of the UE.

8. The apparatus according to claim 7, wherein the MDT measurement result determining component is configured to configure the UE with an MDT measurement, trigger the UE to perform the MDT measurement and obtain the MDT measurement result reported by the UE; or is configured to make the MDT measurement on the UE and determine the MDT measurement result corresponding to the UE.

9. The apparatus according to claim 8, further comprising:
- a location information sending component configured to send the MDT measurement result, to which the location information of the UE is added, to a Trace Control Entity.

10. The apparatus according to claim 7, further comprising:
- a location information sending component configured to send the MDT measurement result, to which the location information of the UE is added, to a Trace Control Entity.

11. The apparatus according to claim 10, wherein the location information sending component is configured to record multiple MDT measurement results and multiple pieces of the location information of the UE added to the MDT measurement results; and send the recorded multiple MDT measurement results and multiple pieces of the location information of the UE added to the MDT measurement results to the Trace Control Entity by reporting a trace record.

12. The apparatus according to claim 10, wherein the location information sending component is configured to send the MDT measurement result, to which the location information of the UE is added, to the Trace Control Entity through an Element Management, EM.

* * * * *